(12) United States Patent
Lee et al.

(10) Patent No.: US 11,285,870 B2
(45) Date of Patent: Mar. 29, 2022

(54) EXPANSION TYPE CAUTION DEVICE

(71) Applicant: Sonoma Consulting & Construction, Inc., La Habra, CA (US)

(72) Inventors: Bo Kyung Lee, La Habra, CA (US); Sang Wook Lee, La Habra, CA (US)

(73) Assignee: SONOMA CONSULTING & CONSTRUCTION, INC., La Habra, CA (US)

( * ) Notice: Subject to any disclaimer, the term of this patent is extended or adjusted under 35 U.S.C. 154(b) by 441 days.

(21) Appl. No.: 16/518,841

(22) Filed: Jul. 22, 2019

(65) Prior Publication Data
US 2020/0139886 A1 May 7, 2020

(51) Int. Cl.
| | | |
|---|---|---|
| *B60Q 7/00* | (2006.01) | |
| *G08B 5/06* | (2006.01) | |
| *B60Q 1/52* | (2006.01) | |
| *B60Q 1/26* | (2006.01) | |
| *B60Q 1/30* | (2006.01) | |

(52) U.S. Cl.
CPC .......... *B60Q 7/005* (2013.01); *B60Q 1/2615* (2013.01); *B60Q 1/30* (2013.01); *B60Q 1/52* (2013.01); *G08B 5/06* (2013.01)

(58) Field of Classification Search
CPC .......... G08B 5/06; B60Q 1/2615; B60Q 1/30; B60Q 1/52; B60Q 7/00; B60Q 7/005
See application file for complete search history.

(56) References Cited

U.S. PATENT DOCUMENTS 4,052,955 A * 10/1977 Haushalter ............... G08B 5/40
116/210
2006/0169194 A1* 8/2006 Zumaquero Jimenez ...................
B60Q 1/52
116/35 R

FOREIGN PATENT DOCUMENTS

| KR | 101006731 | 1/2011 |
| KR | 1020150116145 | 10/2015 |
| KR | 101813209 | 12/2017 |

* cited by examiner

*Primary Examiner* — Thomas M Sember
(74) *Attorney, Agent, or Firm* — Cislo & Thomas, LLP

(57) ABSTRACT

An inflatable warning system for roads that enables the user to warn the rear driver by expanding an inflatable tube, which is a warning system. More specifically, when the driver pulls the handle of the gas injector formed on the main body, the compressed gas stored in a gas container is instantaneously injected to the inflatable tube, and the warning system expanded by the injected compressed gas stands up, thereby notifying the rear driver to recognize the warning system to prevent an accident.

1 Claim, 9 Drawing Sheets

EXPANSION TYPE CAUTION DEVICE

CROSS-REFERENCE TO RELATED APPLICATION

This patent application claims priority to and the benefit of Korean Patent Application No. 1020180134988, filed Nov. 6, 2018, which application is incorporated in its entirety here by this reference.

TECHNICAL FIELD

The present invention pertains to an inflatable warning system for roads that enables the user to warn the rear driver by expanding an inflatable tube, which is a warning system.

BACKGROUND

Motor vehicles move at high speed on roads. In the event that a car stops on the road due to a mechanical failure caused by inadequate care or by external factors or due to an accident, if the driver of the car behind fails to see the stopped car in front collision will occur, resulting in enormous personal and property damages.

Therefore, if it becomes impossible to operate his or her vehicle, the triangle attached with a reflection panel widely used whereby a driver uses the triangle to notify the driver of the motor vehicle behind of the danger in front, and conventional technologies related to such warning systems include Korean Utility Design Registration 200197154 (a warning triangle for motor vehicles), which design registration is incorporated here in its entirety.

The conventional triangular warning systems including the warning system described in Korean Utility Design 200197154 are stored in vehicles' trunks, and when it becomes impossible for a driver to operate his or her vehicle due to a mechanical failure or due to an accident, the driver uses a triangular warning system in order to notify the driver of the motor vehicle behind of the situation in front of him or her, but there are problems, which will be described below.

First, the triangle's height and width are each about 40 cm, so the size is not large enough for the driver behind to notice the triangle without paying close attention, and as a result the triangle is not appropriately sized to prevent accidents. Also, since the volume is large, the triangle takes up much of trunk space. Although there are foldable triangles, they are smaller than non-foldable triangles but still take up much of trunk space.

Also, all triangles are composed of injection plastic, so they break easily when impacted. Therefore, there are many instances in which the triangle breaks by bumping with other materials in the trunk while the motor vehicle is operating, and as a result it is not possible to use the triangle when needed in such instances. Furthermore, since it is necessary to assemble the triangle in order to use the triangle, it is difficult to use the triangle promptly.

SUMMARY

The inflatable warning system configured to inject compressed gas to an inflatable tube under the present invention has the main body composed of a grid on which the upper storage and the lower storage are formed, a tube formed at the center of the grid, an inflatable tube in compressed state on the upper storage, an injection opening of a gas injector on the lower storage that goes through the tube's side so that the compressed gas stored in the gas container flows into the inflatable tube through the tube, a cap that opens and closes the tube at the lower end of the tube, an inflatable warning system that stands up when the gas container's compressed gas is instantaneously injected to the inflatable tube through the gas injector and the tube, a rotation foot insertion groove and a foot axis formed at the lower end edge of the main body in order for the rotation foot to rotate in order to be stored in the lower storage, with the rotation foot configured to rotate with the foot axis as the axis, wherein the rotation foot is unfolded to the outside of the main body to support the standing of the main body or to reduce the volume of the main body by storing the rotation foot in the rotation foot insertion groove, and a magnet fouled on the lower side of the rotation foot so that the main body can be attached with the magnet's magnetism.

The present invention is small in size, is easy to store, and can be used easily by a driver when he or she has to park the motor vehicle on the road due to a mechanical failure or due to an accident to warn the driver of the rear motor vehicle in order to prevent the rear motor vehicle from hitting the parked motor vehicle.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The specific configuration and mechanical principles of the present invention are described below with references to the drawings.

Figure 1:
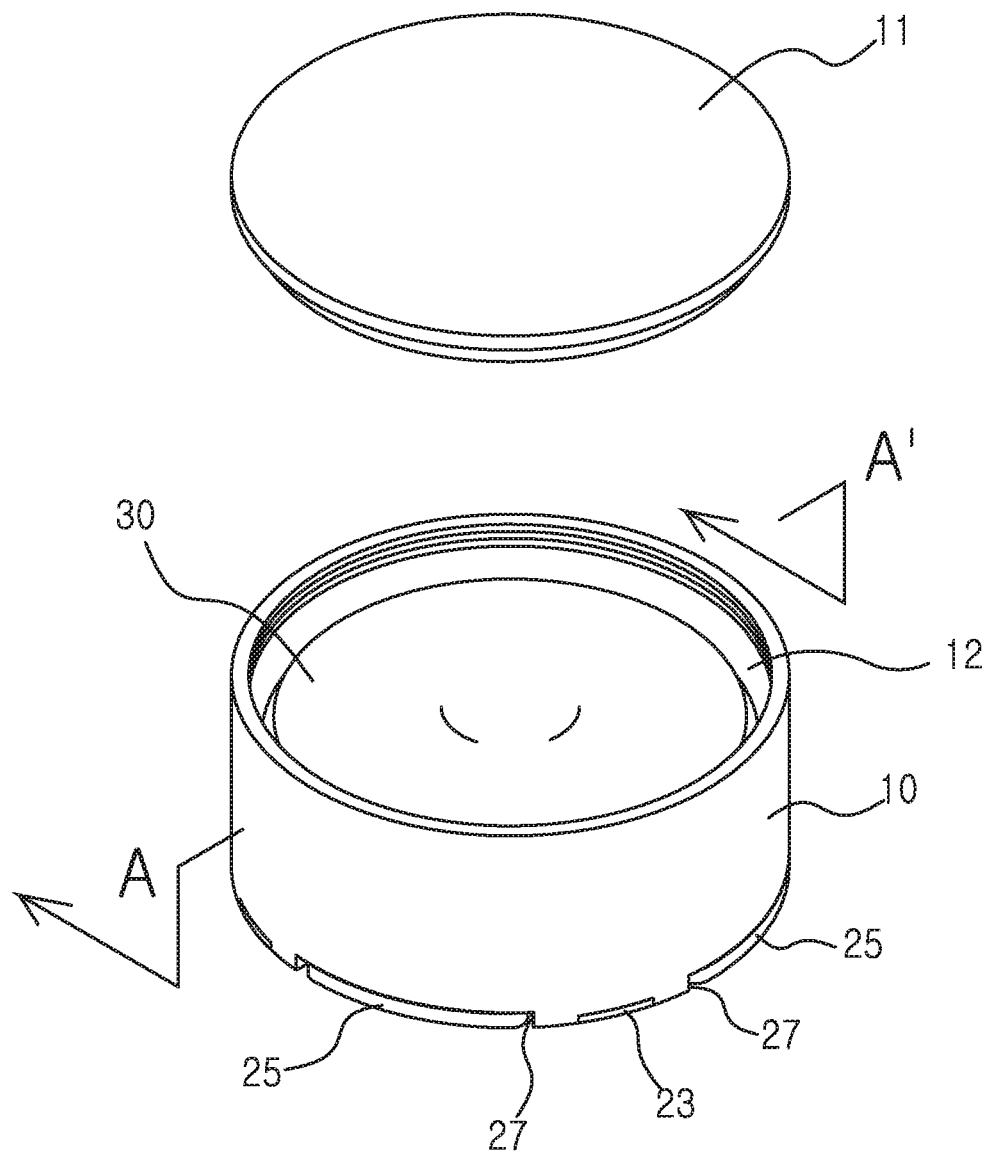
FIG. 1 is a perspective diagram that illustrates the state in which the cap on the main body of the present invention is opened.
Figure 2:
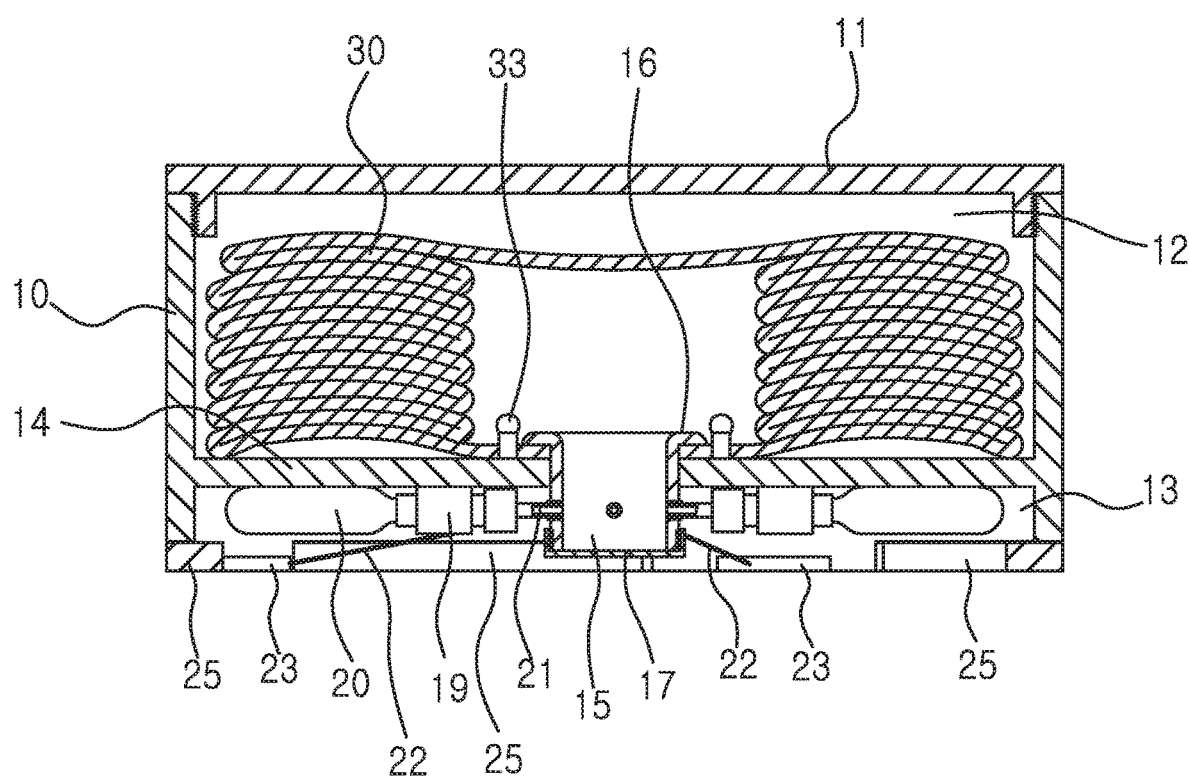
FIG. 2 shows is a cross-sectional diagram of the A-A' line of FIG. 1.
Figure 3:
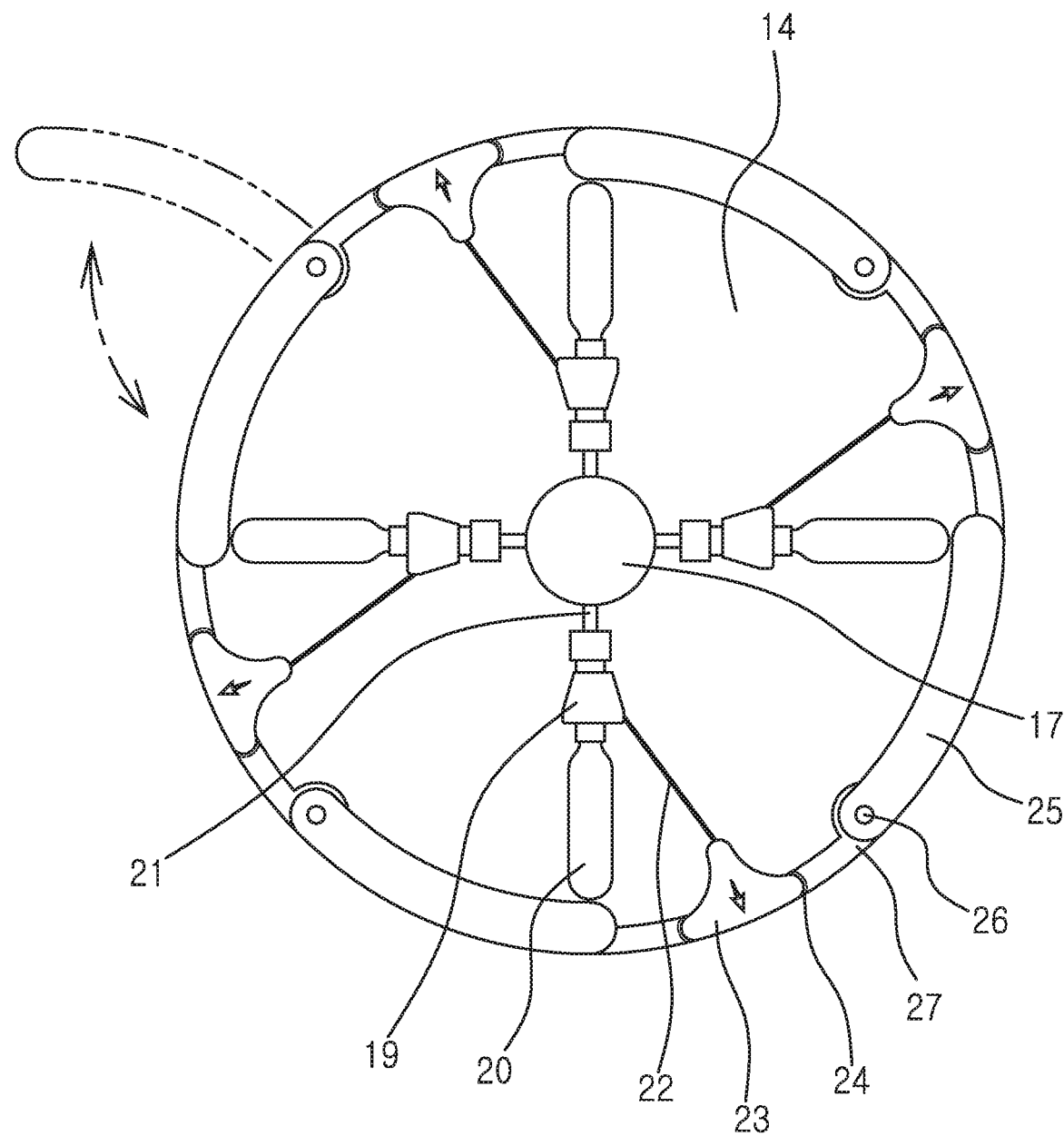
FIG. 3 shows is a bottom view of the present invention.

FIG. 1 illustrates the exterior of the present invention. On the upper part of the cylindrical main body 10 a cap 11 is formed, a contracted inflatable tube 30 is stored in the upper storage 12 of the main body 10, on the lower end edge of the main body 10, a rotation foot 25 is stored in the rotation foot insertion groove 27, and a handle 23 is inserted to the handle insertion groove 24. This is described in detail with references to FIG. 2 and FIG. 3.

In the inner space of the main body 10 of the present invention, a horizontal grid 14 is formed to form the upper storage part 12 and the lower storage part 13, and at the center of the grid 14 a tube 15 is formed.

At the lower end of a tube 15 a cap 17 is provided in order to open or close the tube 15. At the upper end of the tube 15, a fixed ring 16 that goes through the inflatable tube 30 is placed, and an inflatable tube 30 is inserted between the fixed ring's 16 lower side and the grid's 14 upper side in order to fix the inflatable tube 30 and keep air sealed.

A lighting device 33 such as LED is installed inside the inflatable tube 30 in order for the inflatable tube 30 to light up to enable the rear motor vehicle's driver to easily recognize the inflatable tube 30.

At the lower storage 13 of the main body 10, multiple gas injectors 19 to inject compressed gas to the inflatable tube 30 are installed.

The gas injector 19 is composed of a gas container 20 in which compressed gas is store, a pulling string 22 that plays the role of a trigger to spray compressed gas, a handle 23 to easily pull the pulling string 22, and an opening 21 from which compressed gas is sprayed. The gas injector's 19 opening 21 is connected to the tube 15, and when the pulling string 22 is pulled that compressed gas stored in the gas container 20 is injected to the inflatable tube 30 through the opening 21 and the tube 15.

The drawings related to the present invention illustrate that four gas injectors 19 are installed and can be repeatedly used up to four times. However, the number of gas injectors 19 can increase or decrease as needed.

The inflatable tube 30 is made of a plastic material which is small in volume when contracted and which increases in volume when inflated, and on the inflatable tube's 30 surface a fluorescent material and a reflective material are painted or attached in order for the driver of the motor vehicle behind to easily recognize it.

At the lower edge of the main body 10 a handle insertion groove 24 to which a handle 23 is inserted and fixed and a rotation foot insertion groove 27 is formed so that the rotation foot 25 can be stored in the lower storage 13.

The number of the handle insertion grooves 24 is equal to the number of the gas injectors 19, and although the handle 23 is inserted to the handle insertion groove 24 to be fixed, if the handle 23 is pulled downward the handle 23 is removed from the handle insertion groove 24 and at the same time the pulling string 22 is pulled, so that the compressed gas stored in the gas container 20 is injected into the inflatable tube 30.

A foot axis 26 is defined on the rotation foot insertion groove 27, so that the rotation foot 25 stored in the rotation foot insertion groove 27 rotates about the foot axis 26, and when the rotation foot 25 rotates and unfolds to the outer side of the main body 10, the main body 10 is supported to enable it to stand upright, and when the rotation foot 25 rotates and is stored in the rotation foot insertion groove 27, the volume decreases so it becomes easy to store in the main body 10.

An example of how the present invention is to be used is described below with references to FIG. 4 through FIG. 6.

Figure 4:
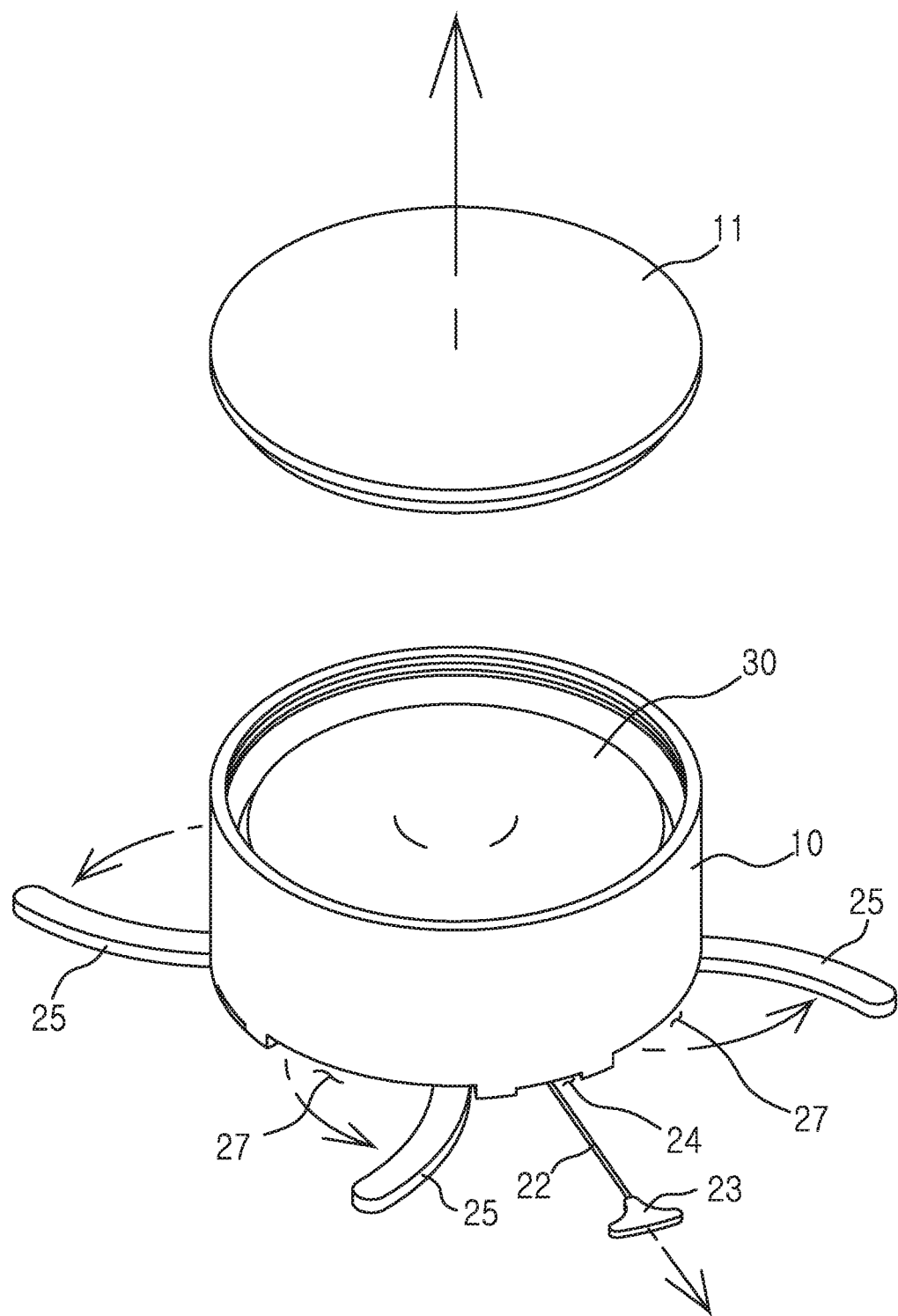
FIG. 4 is a drawing that illustrates the state in which the present invention is being used.

In the event that a motor vehicle is stopped on the road due to the fact that it cannot be operated as are result of a breakdown or accident, as illustrated in FIG. 4 when the handle 23 is pulled after the cap 11 attached to the main body 10 is opened to expose the inflatable tube 30, the handle 23 is removed from the handle insertion groove 24, and at the same time the pulling string 22 is pulled in order for the compressed gas stored in the gas container 20 to be instantaneously injected to the inflatable tube 30 through the opening 21 and the tube 15 in order to fill the inflatable tube 30 with compressed gas.

Figure 5:
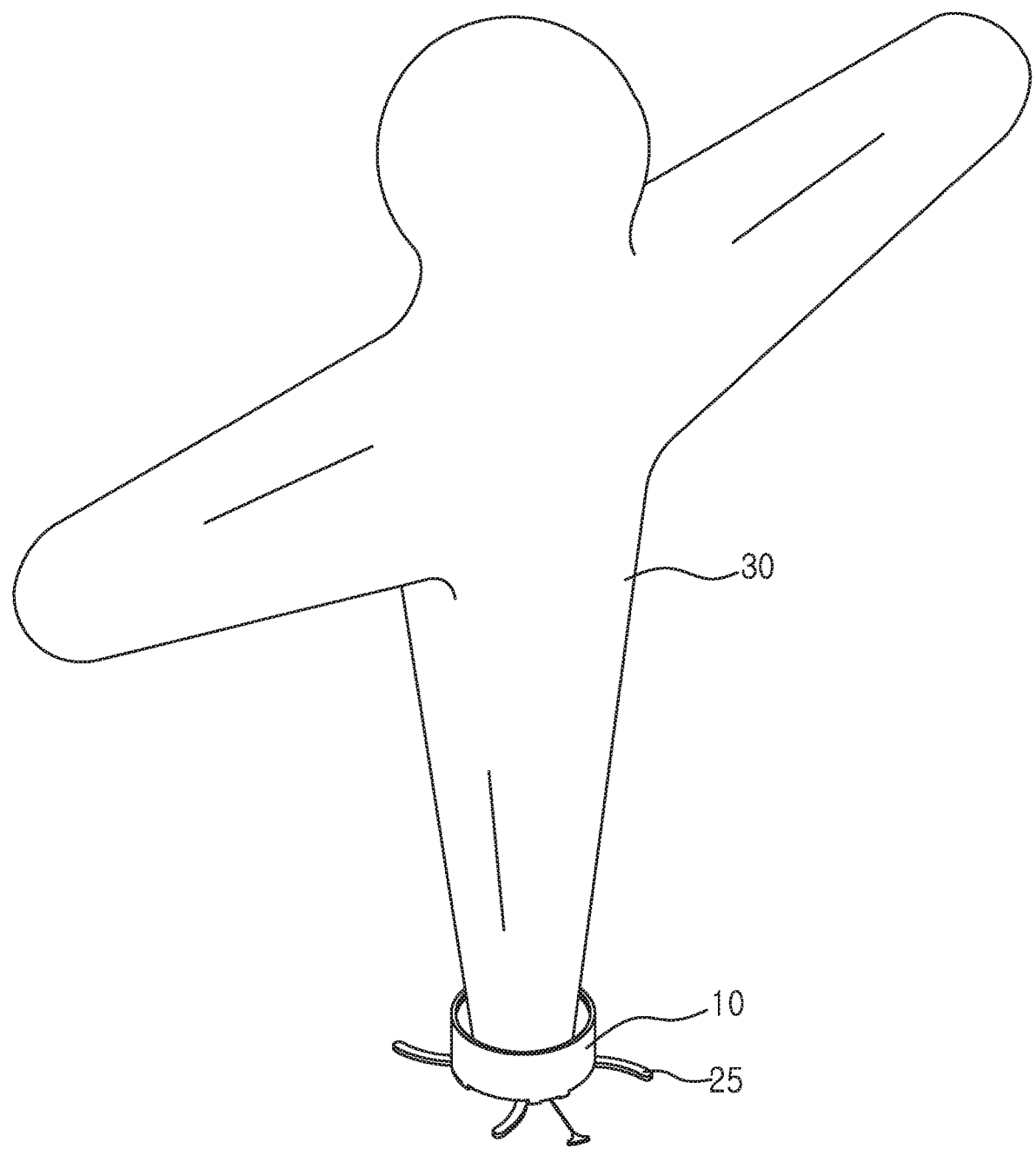
FIG. 5 is a drawing that illustrates the state in which the inflatable tube under the present invention is standing on the main body after being expanded.

As illustrated in FIG. 5, the inflatable tube 30 stands upright as volume increases. The inflatable tube 30 is much larger than the conventional triangle in terms of volume, and a fluorescent material and a reflective material are painted or attached to the surface, so the driver behind who recognizes the inflated inflatable tube 30 can easily recognize the dangerous situation in front.

The rotation foot 25 installed on the lower side of the main body 10 is unfolded to the outside as needed in order to support the main body 10 whose inflatable tube 30 is standing upright to maintain the upright position.

Figure 6:
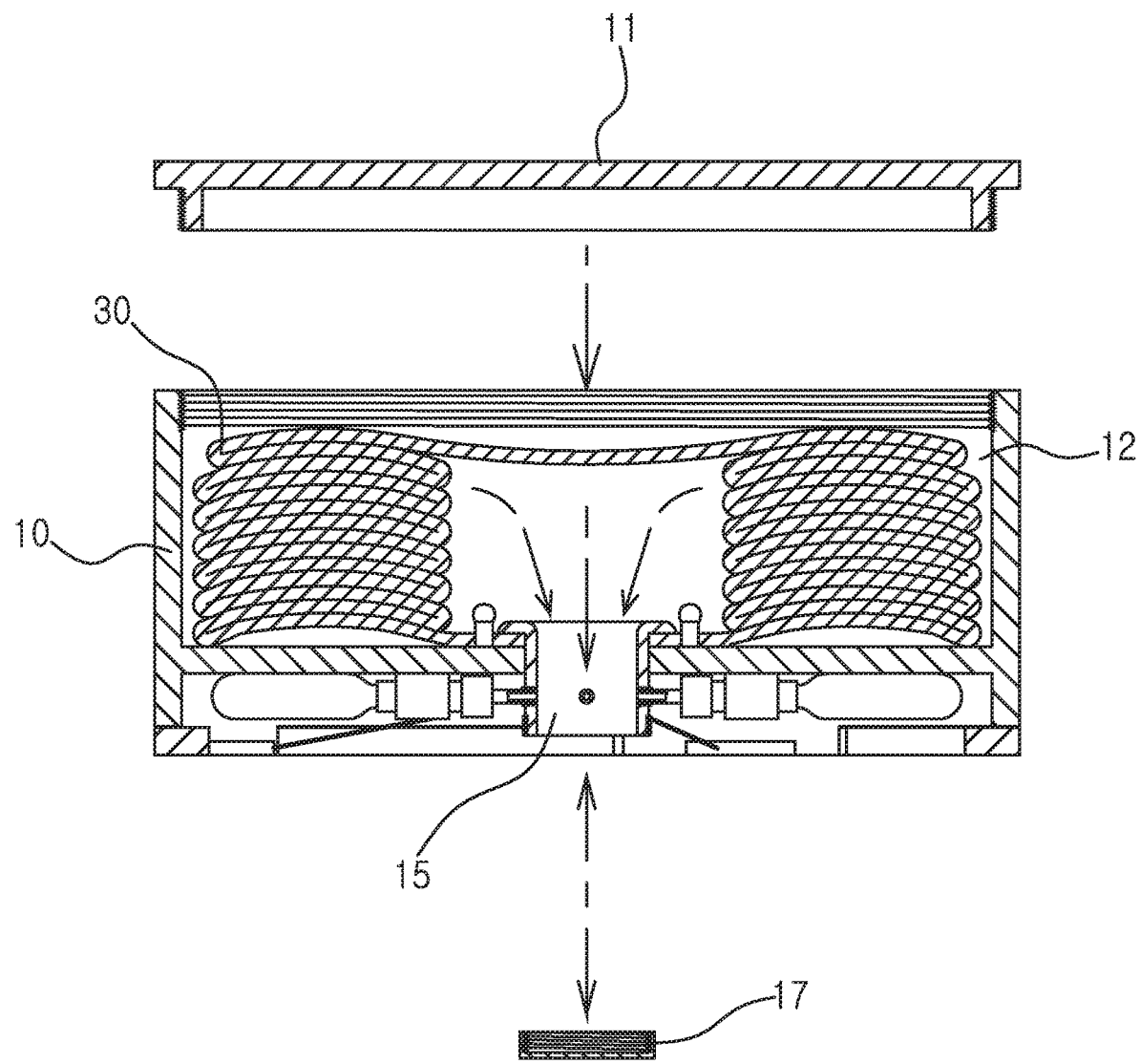
FIG. 6 is a cross-sectional diagram that illustrates the state in which the inflatable tube under the present invention is stored in the main body after being contracted.

After the use of the present invention is finished, the cap 17 formed in to the tube 15 is opened and the inflatable tube 30 is contracted, as illustrated in FIG. 6. At this time, the compressed gas filled in the inflatable tube 30 is emitted outside through the tube 15, so it is possible to easily contract the inflatable tube 30 and store in the upper storage 12.

When the inflatable tube 30 is stored in the upper storage 12, the main body 10 is closed with the cover 11, and the cap 17 is closed in order to seal the tube 15, and the system can be used repeatedly up to the number of the unused gas injectors 19 left in the main body 10.

Figure 7:
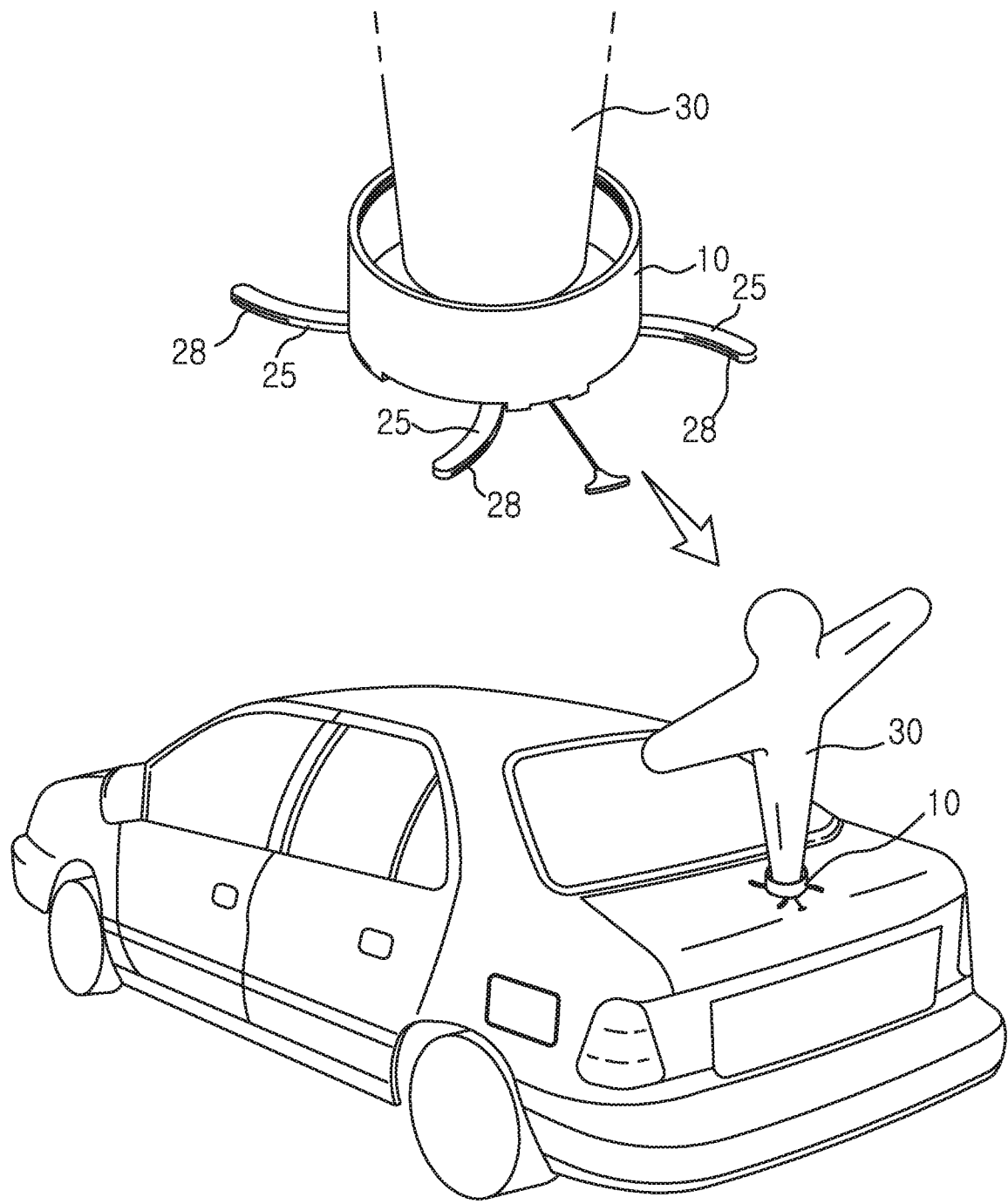
FIG. 7 is a drawing that illustrates the state in which the inflatable warning system under the present invention is attached to a motor vehicle by a magnet formed on the rotation foot.

On the other hand, FIG. 7 illustrates a magnet 28 attached to the lower side of the rotation foot 25 under the present invention.

With the warning system that has a magnet 28 installed on the rotation foot 25 under the present invention, when a motor vehicle breaks down or becomes involved in an accident the inflatable tube 30 is inflated and the rotation foot 25 is unfolded, and then the warning system is attached to the automobile's exterior using the magnet 28. Since the warning system c placed at a high location, the driver behind can recognize the warning system more easily than a warning system placed on the ground, thereby recognizing the warning system and responding to the situation more easily.

Figure 8:
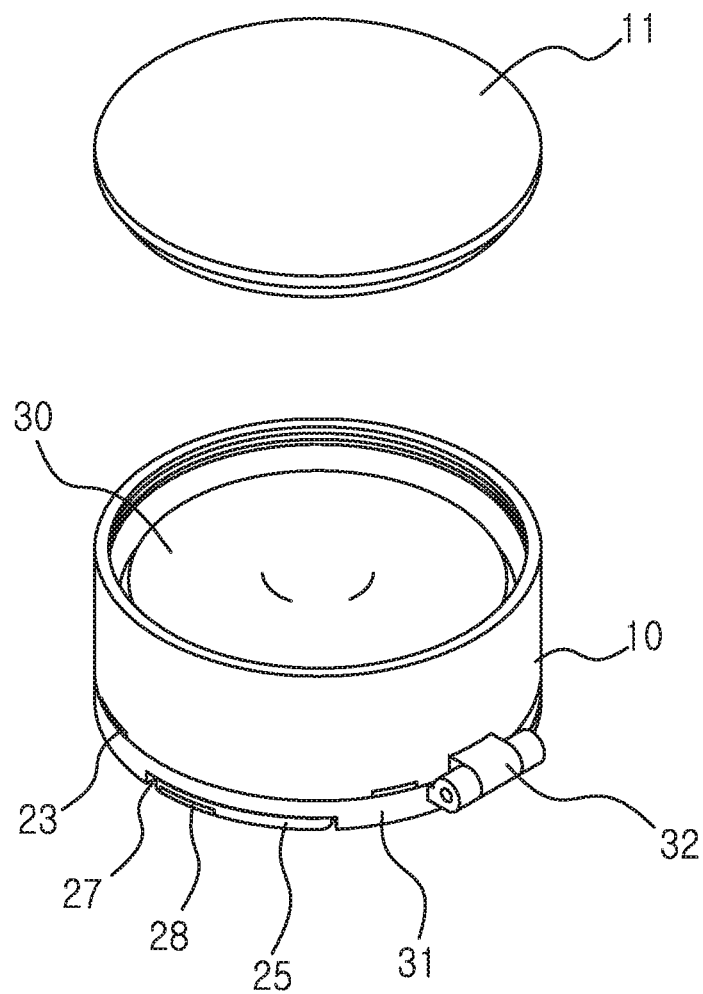
FIG. 8 is a drawing that illustrates the rotation support under the present invention.

Also, according to FIG. 8, a rotation support 31 in the shape of a ring on the main body's 10 circumference is formed at the lower end of the main body 10, and the main body 10 and the rotation support 31 are connected with a hinge 32 in order for the rotation support 31 to rotate downward, and the rotation foot insertion groove 27 formed on the lower end of the main body 10 and the rotation foot 25 on which a magnet 28 is installed are positioned at the lower end of the rotation support 31.

Figure 9:
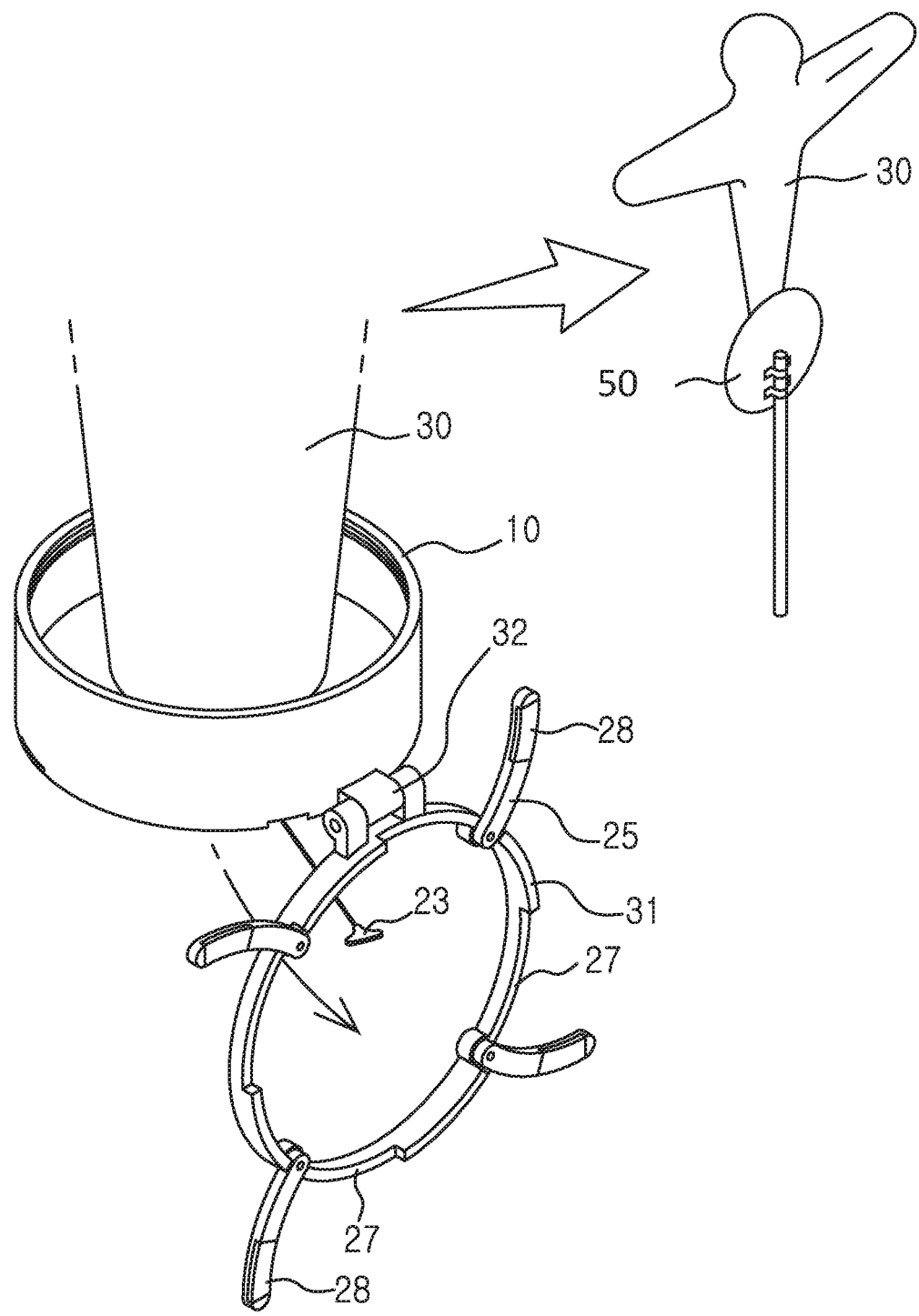
FIG. 9 is a drawing that illustrates the state in which the rotation support under the present invention has rotated.

With the invention described above, as illustrated in FIG. 9 the rotation support 31 is rotated 90 degrees downward, and then the rotation foot 25 is unfolded and the inflatable tube 30 is inflated. Afterwards, the main body 10 is attached to a steel structure 50 such as a road sign or guard rail located about 30 m behind the location where the motor vehicle was stopped due to a mechanical failure or accident using the magnet 28 installed on the rotation foot 25, the driver behind can recognize the situation in front of him or her by easily recognizing the inflatable tube 30 and respond accordingly, and as a result the probability of an accident occurring is further lowered.

Description of the Parts

10: Main body
11: Cover
12: Upper storage
13: Lower storage
14: Grid
15: Tube
16: Fixed ring
17: Cap
19: Gas injector
20: Gas container
21: Opening
22: Pulling string
23: Handle
24: Handle insertion groove
25: rotation foot
26: Foot axis
27: rotation foot insertion groove
28: Magnet
30: Inflatable tube
31: Rotation support
32: Hinge
33: Lighting device
50: Structure The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. An inflatable warning system, comprising:

a main body comprising a grid defining an upper storage above the grid, and a lower storage below the grid;

a tube in the main body, the tube connecting the upper storage with the lower storage;

a gas container in the lower storage, the gas container comprising compressed gas;

a gas injector in the lower storage, the gas injector operatively connected to the gas container and the tube;

an inflatable tube stored in the upper storage of the main body and operatively connected to the tube such that the compressed gas stored in the gas container of the gas injector is injectable into the inflatable tube through the tube;

a cap formed at the lower end of the tube;

a rotation foot that is rotatable about a foot axis and stored in a rotation foot insertion groove at a lower edge of the main body;

a magnet installed at a lower side of the rotation foot; and a rotation support formed as a ring and installed around a circumference of the main body on the lower edge of the main body, wherein the main body and the rotation support are connected by a hinge, wherein the rotation foot, the rotation foot insertion groove, and the magnet are at a lower end of the rotation support, and wherein when the rotation foot is unfolded after rotating the rotation support 90 degrees downward the main body is configured to be attached to a steel structure by the magnet.

* * * * *